United States Patent
Larzul et al.

(10) Patent No.: US 11,494,624 B2
(45) Date of Patent: Nov. 8, 2022

(54) ACCELERATING NEURON COMPUTATIONS IN ARTIFICIAL NEURAL NETWORKS WITH DUAL SPARSITY

(71) Applicant: Mipsology SAS, Palaiseau (FR)

(72) Inventors: Ludovic Larzul, El Dorado Hills, CA (US); Sebastien Delerse, Brétigny sur orge (FR)

(73) Assignee: MIPSOLOGY SAS, Palaiseau (FR)

( * ) Notice: Subject to any disclaimer, the term of this patent is extended or adjusted under 35 U.S.C. 154(b) by 842 days.

(21) Appl. No.: 16/416,891

(22) Filed: May 20, 2019

(65) Prior Publication Data

US 2020/0372328 A1  Nov. 26, 2020

(51) Int. Cl.
*G06N 3/063* (2006.01)
*G06N 3/08* (2006.01)
*G06F 7/544* (2006.01)

(52) U.S. Cl.
CPC .......... *G06N 3/063* (2013.01); *G06F 7/5443* (2013.01); *G06N 3/082* (2013.01)

(58) Field of Classification Search
None
See application file for complete search history.

(56) References Cited

U.S. PATENT DOCUMENTS

| | | | | |
|---|---|---|---|---|
| 6,115,805 A * | 9/2000 | Rhodes | ................. | G06F 9/3885 |
| | | | | 712/216 |
| 6,138,136 A * | 10/2000 | Bauer | ................. | G06F 15/7857 |
| | | | | 712/35 |
| 7,650,374 B1 * | 1/2010 | Gura | ......................... | G06F 7/53 |
| | | | | 708/620 |
| 2011/0231467 A1 * | 9/2011 | Ahn | ....................... | G06F 7/728 |
| | | | | 708/490 |
| 2018/0164866 A1 * | 6/2018 | Turakhia | ................. | G06N 3/02 |
| 2018/0189056 A1 * | 7/2018 | Turakhia | ............... | G06F 9/3001 |
| 2018/0218518 A1 | 8/2018 | Yan et al. | | |
| 2018/0373978 A1 * | 12/2018 | Yu | ............................ | G06N 3/10 |

* cited by examiner

*Primary Examiner* — Eric Coleman
(74) *Attorney, Agent, or Firm* — Georgiy L. Khayet

(57) ABSTRACT

Systems and methods for accelerating computation of an artificial neural network (ANN) are provided. An example method comprises receiving, by processing units coupled with arithmetic units and accumulation units, a first plurality of first values and a second plurality of second values associated with one or more neurons of the ANN, generating, by the processing units, a plurality of pairs, wherein each pair of the plurality of pairs has a first value of the first plurality and a second value of the second plurality and the first value and the second value satisfy criteria, performing, by the arithmetic units, mathematical operations on pairs of the plurality of pairs to obtain results; accumulating, by the accumulation units, the results to obtain accumulated results, and determining, by the processing units and based on the accumulated results, an output of the neurons.

18 Claims, 11 Drawing Sheets

ACCELERATING NEURON COMPUTATIONS IN ARTIFICIAL NEURAL NETWORKS WITH DUAL SPARSITY

TECHNICAL FIELD

The present disclosure relates generally to data processing and, more particularly, to a system and method for accelerating neuron computations in artificial neural networks (ANNs) by exploiting dual sparsity of ANN.

BACKGROUND

Artificial Neural Networks (ANNs) are simplified and reduced models reproducing the behavior of human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each of the connections can be associated with an operation of multiplication by a constant. The ANNs are particularly useful for solving problems that cannot be easily solved by classical computer programs.

While forms of the ANNs may vary, they all have the same basic elements similar to the human brain. A typical ANN can be organized into layers, and each of the layers may include many neurons sharing similar functionality. The inputs of a layer may come from a previous layer, multiple previous layers, any other layers, or even the layer itself. Major architectures of ANNs include Convolutional Neural Network (CNN), Recurrent Neural Network (RNN) and Long Term Short Memory (LTSM) network, but other architectures of ANN can be developed for specific applications. While some operations have a natural sequence, for example a layer depending on previous layers, most operations can be carried out in parallel within the same layer. The ANNs can then be computed in parallel on many different computing elements similar to neurons of the brain. A single ANN may have hundreds of layers. Each of the layers can involve millions of connections. Thus, a single ANN may potentially require billions of simple operations like multiplications and additions.

Because of the larger number of operations and their parallel nature, ANNs can result in a very heavy load for processing units (e.g., CPU), even ones running at high rates. Sometimes, to overcome limitations of CPUs, graphics processing units (GPUs) can be used to process large ANNs because GPUs have a much higher throughput capacity of operations in comparison to CPUs. Because this approach solves, at least partially, the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations. However, the GPUs are constraining the computations in long pipes implying latency and lack of reactivity. To deliver the maximum throughput, very large GPUs can be used, which may involve excessive power consumption, which is a typical issue of GPUs. Since the GPUs may require more power consumption for the computations of ANNs, the deployment of GPUs can be difficult.

To summarize, CPUs provide a very generic engine that can execute very few sequences of instructions with a minimum effort in terms of programming, but lack the power of computing for ANN. The GPUs are slightly more parallel and require a larger effort of programming than CPUs, which can be hidden behind libraries with some performance costs but are not very well suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. One of the challenges of FPGAs is the programming, which requires a much larger effort than programming CPUs and GPUs. Adaption of FPGAs to perform ANN computations can be more challenging than for CPUs and GPUs.

Most attempts in programming FPGAs to compute ANNs have being focusing on a specific ANN or a subset of ANNs requiring modification of the ANN structure to fit into a specific limited accelerator, or providing a basic functionality without solving the problem of computing ANN on FPGAs globally. The computation scale is typically not considered for existing FPGA solutions, with much of the research being limited to a single or few computation engines, which could be replicated. The existing FPGA solutions do not solve the problem of massive data movement required at large scale for the actual ANN involved in real industrial applications. The inputs to be computed with an ANN are typically provided by an artificial intelligence (AI) framework. Those programs are used by the AI community to develop new ANN or global solutions based on ANN. Furthermore, the FPGAs lack integration in those software environments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an example embodiment, a system for accelerating neuron computations in an ANN is provided. The system may include one or more arithmetic units, one or more accumulation units, and one or more processing units coupled with the arithmetic units and the accumulation units. The processing units may receive a first plurality of first values and a second plurality of second values associated with one or more neurons of the ANN. The processing units may determine a plurality of pairs. Each pair of the plurality of pairs may have a first value of the first plurality and a second value of the second plurality such that the first value and the second value satisfy criteria. The arithmetic units can perform mathematical operations on pairs of the plurality of pairs to obtain one or more results. The accumulation units can accumulate the one or more results to obtain accumulated results. The processing units may determine, based on at least one of the accumulated results, an output of the neurons.

The processing units can be configured to determine that the first value and the second value satisfy the criteria by comparing the first value to a first reference number or comparing the second value to a second reference number. The first reference number or the second reference number can be zero.

A number of the accumulation units can be larger than a number of the arithmetic units. The processing units can assign a label to the pair of the plurality of pairs. The label can be associated with at least one accumulation unit of the accumulation units. The processing units may select, based on the label, an accumulation unit from the accumulation units to accumulate a result of mathematical operations performed on the pair. Different accumulation units can be configured to accumulate the results of the mathematical operations performed by the same arithmetic unit.

At least one accumulation unit of the accumulation units can be configured to accumulate results of mathematical operations performed by at least two different arithmetic units of the arithmetic units.

A count of pairs in the plurality of pairs can be less than a count of all possible pairs of the first values of the first plurality and the second values of the second plurality.

Prior to determining the plurality of pairs, the processing units can be configured to, for each first value of the first plurality of the first values, determine that the first value can be omitted in the computations of the neurons. Based on the determination that the first value can be omitted, the processing units can label the first value with a first label. For each second value of the second plurality of the second values, the processing units may determine that the second value can be omitted in the computation of the neurons. Based on the determination that the second value can be omitted, the processing units can label the second value with the second label. The determining that the first value and the second value satisfy the criteria may include determining that the first label and the second label satisfy further criteria.

The first label may include a first binary enable signal and the second label may include a second binary enable signal. Determining that the first label and the second label satisfy further criteria may include computing a result of a Boolean operation on the first binary enable signal and the second binary enable signal and comparing the result of the Boolean operation to a logical true.

The first plurality of first values may include inputs of the neurons of the ANN and the second plurality of the second values may include weights associated with the inputs of the neurons of the ANN. Alternatively, the first plurality of first values may include weights associated with the inputs of the neurons of the ANN and the second plurality of the second values may include the inputs of the neurons.

At least one arithmetic unit of the arithmetic units may include at least one electronic circuit configured to perform mathematical operations. The electronic circuit may include one or more clock signals to trigger performance of mathematical operations by the at least one electronic circuit. The arithmetic unit can be configured to execute, at a first cycle of the clock, a mathematical operation on a first pair of the plurality of pairs based on a clock of the one or more clock signals to obtain a first result to be accumulated by a first accumulation unit of the accumulation units. At a second cycle of the clock, the arithmetic unit can be configured to execute a mathematical operation on a second pair of the plurality of pairs to obtain a second result to be accumulated by a second accumulation unit of the accumulation units. At a third cycle of the clock, the arithmetic unit can be configured to execute a mathematical operation on a third pair of the plurality of pairs to obtain a third result to be accumulated by the first accumulation unit of the accumulation units. The first accumulation unit can differ from the second accumulation unit.

The electronic circuit may include one or more enable signals to trigger at least one of the accumulation units to accumulate result of mathematical operation of the arithmetic unit. The performing the mathematical operations on a pair of the plurality of the pairs may include multiplication of a first value of the pair and a second value of the pair.

At least one accumulation unit of the accumulation units may include at least one adder unit, at least one multiplexer unit, and a plurality of register units. The accumulation unit can be configured to receive a result from at least one of the arithmetic units and an information on selection. The multiplexer unit can be configured to select, based on the information of selection, a register unit from the plurality of register units. The multiplexer unit may provide a value stored in the selected register unit to the adder unit. The adder unit can perform an addition of the stored value and the result to obtain a sum. The selected register can further store the sum.

According to another example embodiment, a method for accelerating neuron computations in the ANN is provided. The method may include receiving, by one or more processing units coupled with one or more arithmetic units and one or more accumulation units, a first plurality of first values and a second plurality of second values associated with one or more neurons of the ANN. The method may determine, by the processing units, a plurality of pairs. Each pair of the plurality of pairs may have a first value of the first plurality and a second value of the second plurality, wherein the first value and the second value satisfy criteria. The method may perform, by the arithmetic units, mathematical operations on pairs of the plurality of pairs to obtain one or more results. The method may accumulate, by the accumulation units, the one or more results to obtain accumulated results. The method may determine, by the processing units and based on at least one of the accumulated results, an output of the neurons.

After generating the plurality of pairs, the method may assign, by the processing units, labels to the pairs of the plurality of pairs. Each of the labels can be associated with at least one accumulation unit of the accumulation units. The method may select, by the processing units and based on the labels, an accumulation unit from the accumulation units to accumulate a result of mathematical operations performed on a pair of the plurality of pairs. Different accumulation units can be configured to accumulate the results of the mathematical operations performed by the same arithmetic unit.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

Figure 1:
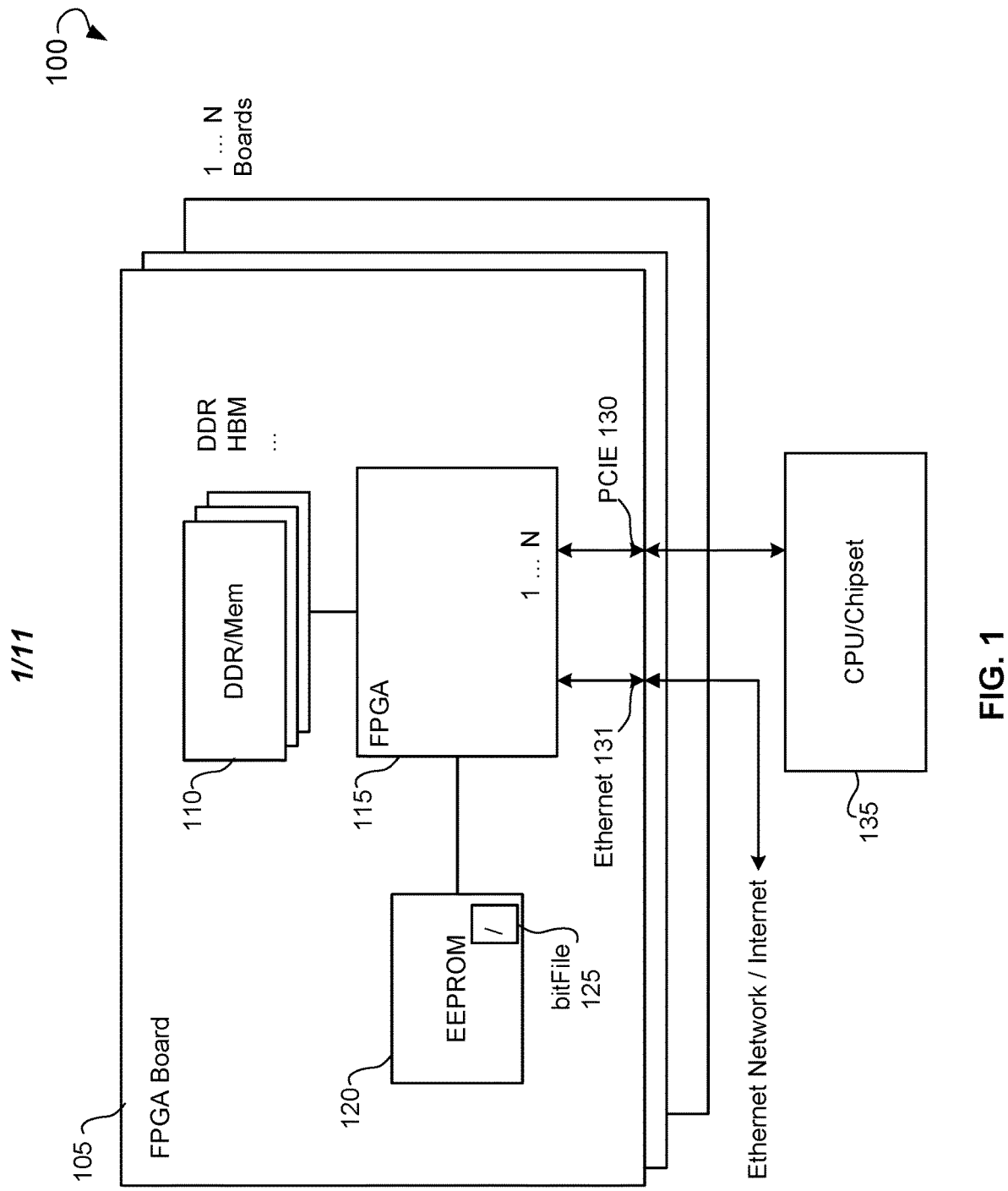
FIG. 1 is a block diagram showing an example system wherein a method for acceleration of neuron computations in ANNs can be implemented, according to some example embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Embodiments of this disclosure are concerned with methods and systems for accelerating neuron computations in ANNs. Embodiments of the present disclosure may accelerate computation of neurons in an ANN by skipping irrelevant operations performed by hardware units configured to calculate neurons of the ANN, wherein the computations of neurons are performed on different hardware units that share the same input values and/or the same weights. Some embodiments of the present disclosure may allow labeling the input values and weights that can be skipped in the computations of neurons. Some embodiments may provide, to the hardware units, substantially only those pairs of the input values and the weights, wherein both the input values and the weight cannot be skipped.

Embodiments of the present disclosure can be implemented using integrated circuits, for example, CPU, GPU, application-specific integrated circuits (ASICs) or FPGAs. The present technology may be also practiced with programmable logic devices, transistor-based circuits, or various combinations thereof. The methods described herein can be also implemented by hardware modules, software modules, or combinations of both. The methods can also be embodied in computer-readable instructions stored on computer-readable media.

The term "module" shall be construed to mean a hardware device, software, or a combination of both. For example, a hardware-based module can use one or more microprocessors, FPGAs, ASICs, programmable logic devices, transistor-based circuits, or various combinations thereof. Software-based modules can constitute computer programs, computer program procedures, computer program functions, and the like. In addition, a module of a system can be implemented by a computer or server, or by multiple computers or servers interconnected into a network. Alternatively, module may also refer to a subpart of a computer system, a hardware device, an integrated circuit, or a computer program.

Technical effects of certain embodiments of the present disclosure can include configuring integrated circuits, ASICs, FPGAs, or computer systems to perform ANN computations without execution of redundant and unnecessary mathematical operations, thereby accelerating the ANN computations. Further technical effects of some embodiments of the present disclosure can facilitate configuration of integrated circuits, ASICs, FPGAs, or computer systems to dynamically qualify data on which mathematical operations are to be performed in the ANN computations. Yet further technical effects of embodiments of the present disclosure include reducing size of integrated circuits, ASICs, FPGAs, or computer systems required to implement computation of neurons in an ANN.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 is a block diagram showing an example system 100, wherein a method for accelerating neuron computations in ANN can be implemented, according to some example embodiments. The system 100 can be part of a computing system, such as a personal computer, a server, a cloud-based computing recourse, and the like. The system 100 may include one or more FPGA boards 105 and a chipset 135 including at least one CPU. The chipset 135 can be communicatively connected to the FPGA boards 105 via a communication interface. The communication interface may include a Peripheral Component Interconnect Express (PCIE) standard 130. The communication interface may also include an Ethernet connection 131.

The FPGA board 105 may include an FPGA 115, a volatile memory 110, and a non-volatile memory 120. The volatile memory 110 may include a double data rate synchronous dynamic random-access memory (DDR SDRAM), High Bandwidth Memory (HBM), or any other type of memory. The volatile memory 110 may include the host memory. The non-volatile memory 120 may include Electrically Erasable Programmable Read-Only Memory (EEPROM), a solid-state drive (SSD), a flash memory, and so forth.

The FPGA 115 can include blocks. The blocks may include a set of elementary nodes (also referred to as gates) performing basic hardware operations, such as Boolean operations. The blocks may further include registers retaining bit information, one or more memory storage of different sizes, and one or more digital signal processors (DSPs) to perform arithmetic computations (for example, additions and multiplications). Programming of FPGA 115 may include configuring each of the blocks to have an expected behavior and connecting the blocks by routing information between the blocks. Programming of FPGA 115 can be carried out using a result from a compiler taking as input schematic description, gate-level description, hardware languages like Verilog, System Verilog, or Very High Speed Integrated Circuit Hardware Description Language (VHDL), or any combination of thereof.

The non-volatile memory 120 may be configured to store instructions in a form of bit file 125 to be executed by the FPGA 115. The FPGA 115 can be configured by the instructions to perform one or more floating point operations or bitwise operations including multiplication and addition to calculate a sum of products that can be used in neural network computations.

The volatile memory 110 may be configured to store weights W[i] for neurons of one or more ANNs, input values V[i] to be processed for the ANNs, and results of ANNs computation including any intermediate results of computations of layers of the ANNs.

Figure 2:
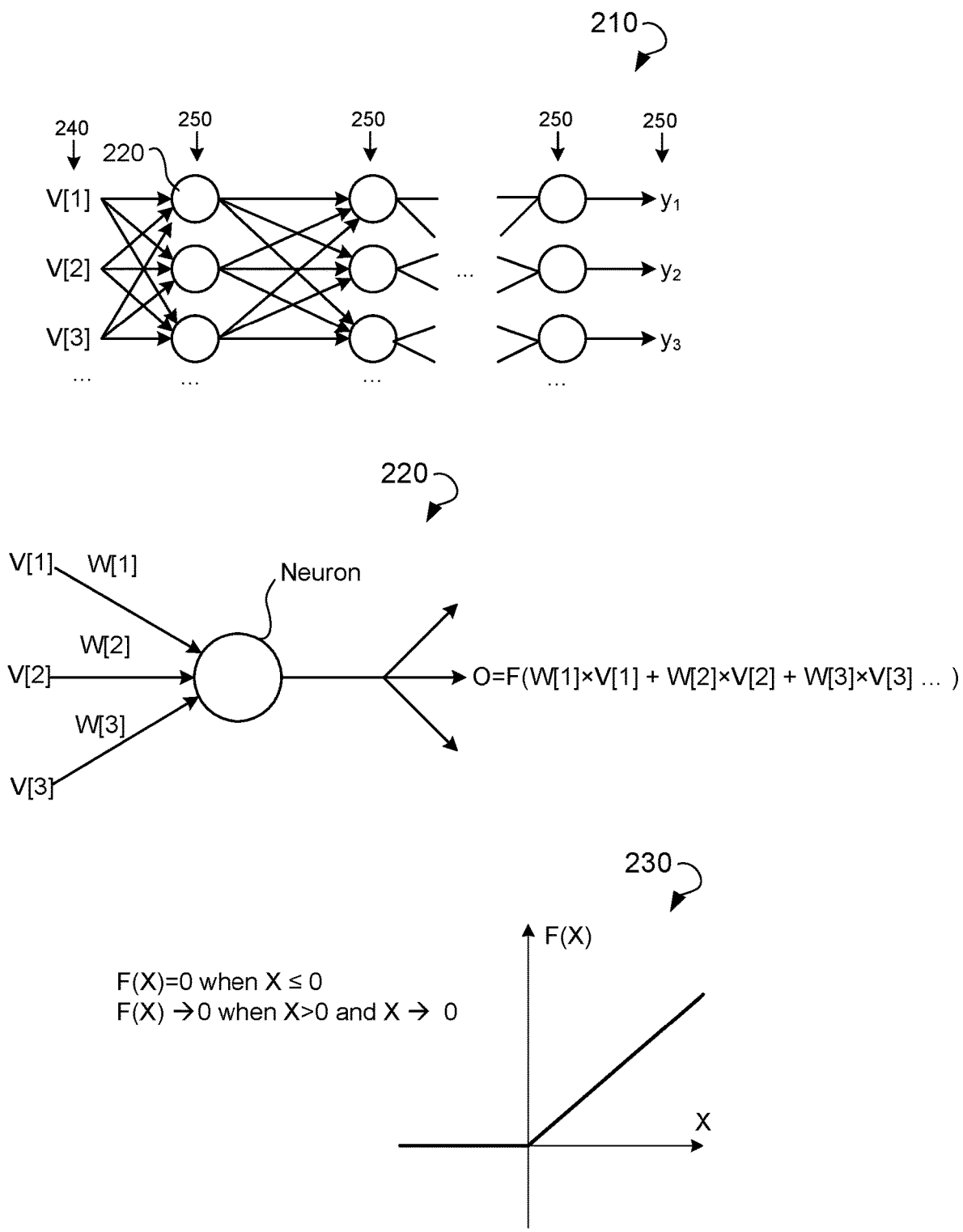
FIG. 2 shows an ANN, neuron, and transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 260. Each of the input layers, hidden layers, and output layers may include one or more (artificial) neurons 220. The number of neurons can be different for different layers.

Each of neurons 220 may represent a calculation of a mathematical function $$O = F\left(\sum_{i=1}^{n} V[i] \times W[i]\right) \quad (1)$$

wherein V[i] are neuron input values, W[i] are weights assigned to input values at neuron, and F(X) is a transfer function. Typically, the transfer function 230 F(X) is selected to be zero for X<0 and have a limit of zero as X approaches zero. For example, the transfer function F(X) can be in the form of a sigmoid. The result of a calculation of a neuron propagates as an input value of further neurons in the ANN. The further neurons can belong to either the next layer, previous layer, or the same layer.

It should be noted that while the ANN 210 illustrated in FIG. 2 can be referred to as a feedforward neural network, embodiments of the present disclosure can be also used in computations of convolutional neural networks, recurrent neural networks, long short-term memory networks, and other types of ANNs.

Figure 3:
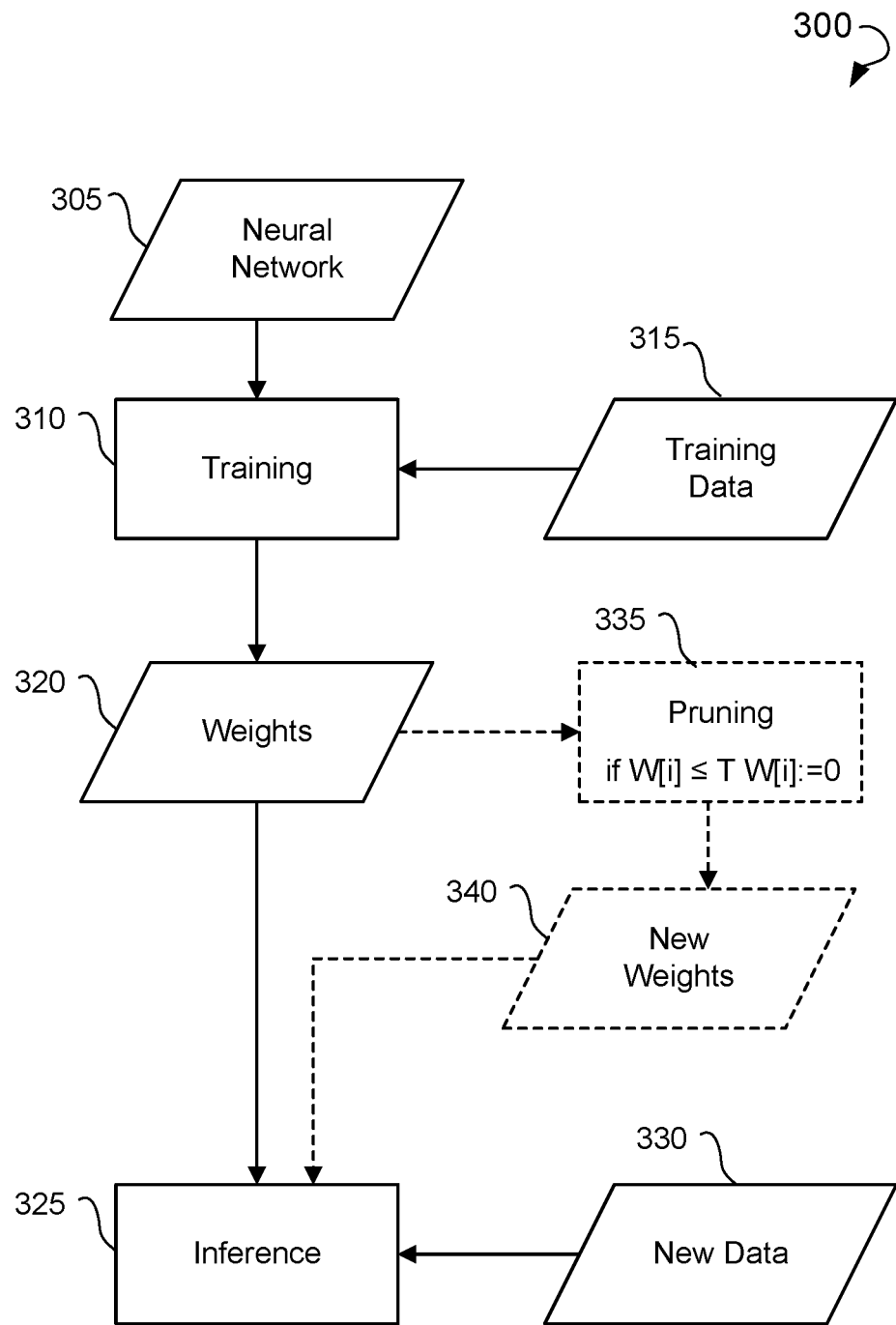
FIG. 3 is a flow chart showing training and inference of an ANN, according to some example embodiments.

FIG. 3 is a flow chart 300 showing training 310 and inference 325 of an ANN, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each of the samples may be represented as a pair of input values and an expected output. The training data 315 may include hundreds to millions of samples. While the training 310 is required to be performed only once, it may require a significant amount of computations and take a considerable time. The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 uses the trained ANN weights 320 and new data 330 including new sets of input values. For each new set of input values, the computation of the ANN provides a new output which answers the problem that the ANN is supposed to solve. For example, an ANN can be trained to recognize various animals in images. Correspondingly, the ANN can be trained on millions of images of animals. Submitting a new image to the ANN would provide the information for animals in the new image (this process being known as image tagging). While the inference for each image takes less computations than training, a number of inferences can be large because new images can be received from billions of sources.

The inference 325 includes multiple computations of sum of products:

$$\sum_{i=1}^{n} V[i] \times W[i] \quad (2)$$

wherein the V[i] are new input values and W[i] are weights associated with neurons of ANN. Some previous approaches for performing inference include inspection of the weights W[i] and replacing some of the weights W[i] with zero values if a value of the weight is relatively small when compared to other weights of the ANN. In FIG. 3, this process is shown as pruning 335. The pruning 335 generates new weights 340 that then can be used in inference 325 instead of the weights 320. Replacing the weights with zero values may allow decreasing the number of computations of the ANN, since multiplications by zero can be avoided in computations. During multiplication, input values corresponding to the neurons may also include zero values. Monitoring zero input values and zero weights and skipping multiplications involving either zero input value or zero weight can be implemented in software-based units. However, the impact of such implementation on performance can be high because skipping multiplications may result in underutilizing the multiplication units of the CPU and creating unpredictable branching instructions. Skipping multiplication by either a zero weight or a zero input value in hardware-based units can be complicated because the same weights or the same input value can be shared by multiple hardware units during the same computational cycle. Therefore, the gain caused by the elimination of execution of the skipped multiplications can be diminished due to the reduction in operations. The reduction in operations can be due to the lack of feeding input values or weights to the hardware units.

Figure 4B:
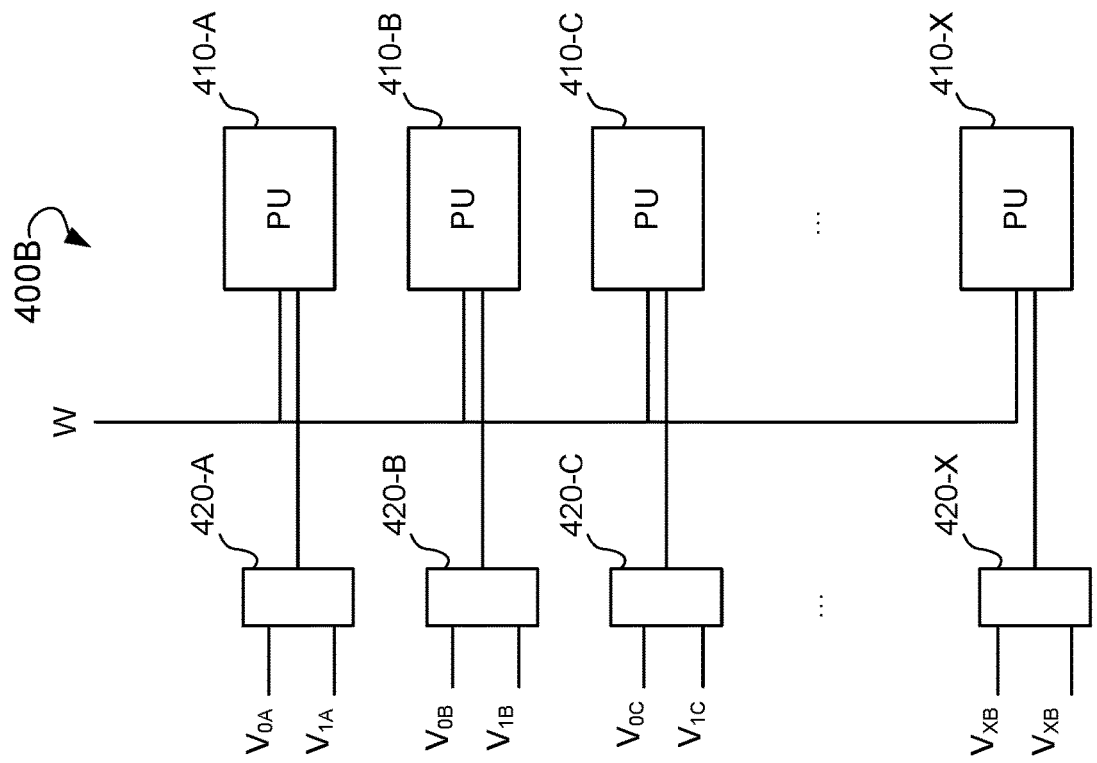
FIG. 4B is a block diagram showing an example system for neuron computations in an ANN.
Figure 4A:
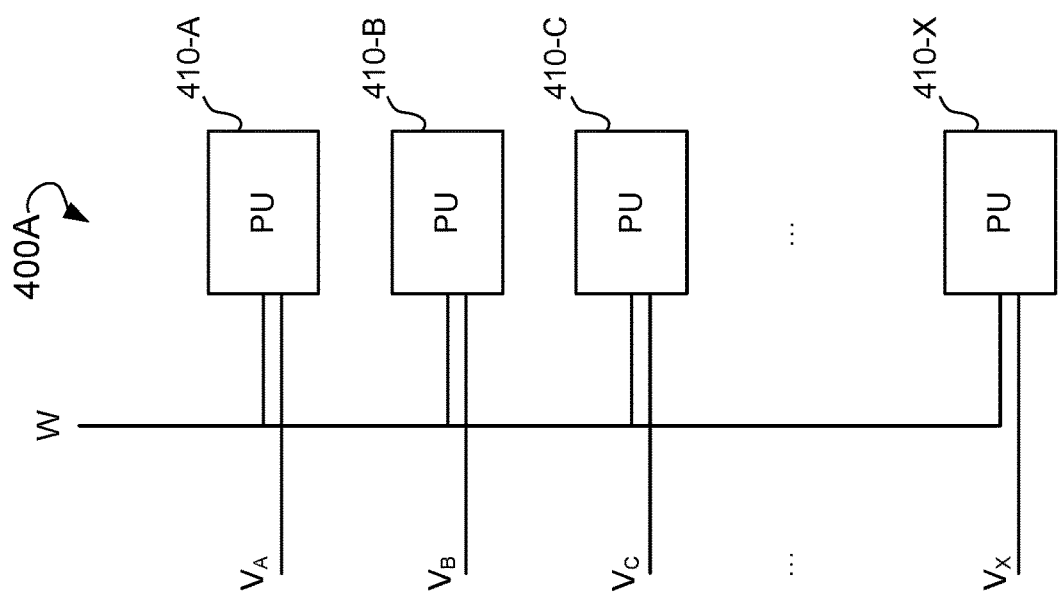
FIG. 4A is a block diagram showing an example system for neuron computations in an ANN.

FIG. 4A is a block diagram showing an example system 400A for neuron computation of an ANN. The system 400A may include any number of arithmetic units 410-$i$ (i=A, B, C, . . . X). During computations of neurons of the ANN, the arithmetic units 410-A, 410-B, 410-C, . . . , 410-X may share inputs values or weights. The same input value $V_i$ or the same weight $W_i$ can be provided to more than one arithmetic unit during a single computational cycle. Both input values $\{V_i\}$ and weights $\{W_i\}$ may include zeros. Non-zero input values and non-zero weights can be sparsely distributed through entire sets of the input values $\{V_i\}$ and weights $\{W_i\}$.

In example of FIG. 4A, the weight W is provided to all the arithmetic units 410-$i$ (i=A, B, C, . . . X) during a single computational cycle. At the same computational cycle, the arithmetic units 410-$i$ (i=A, B, C, . . . X) receive different input values $V_A, V_B, V_C, \ldots, V_X$. The arithmetic units 410-$i$ (i=A, B, C, . . . X) are configured to perform operations including multiplication of the weight W and the input values $V_A, V_B, V_C, \ldots, V_X$. If the weight W is zero, then calculation of all multiplications $W \times V_i$ (i=A, B, C, . . . X) can be skipped by triggering the system 400A to proceed to a next computational cycle. However, if the weight W is not zero, then the arithmetic units 410-$i$ (i=A, B, C, . . . X) perform all the multiplication $W \times V_i$ (i=A, B, C, . . . X). If the input values $V_A, V_B, V_C, \ldots, V_X$ include a substantial number of zero values while non-zero values are sparse in the set of input values $V_A, V_B, V_C, \ldots, V_X$, then the arithmetic units 410-$i$ (i=A, B, C, . . . X) perform a substantial number of irrelevant multiplications by zero.

FIG. 4B is a block diagram showing an example system 400B for neuron computation of an ANN. The system 400A may include arithmetic units 410-$i$ (i=A, B, C, . . . X) and selectors 420-$i$ (i=A, B, C, . . . X). In the example of FIG. 4B, the weight W is provided to all the arithmetic units 410-$i$ (i=A, B, C, . . . X) during a single computational cycle. During the same computational cycle, the selectors 420-$i$ (i=A, B, C, . . . X) receive pairs of the input values ($V_{0i}, V_{1i}$), i=A, B, C, . . . X. The selectors 420-$i$ can be configured to select a non-zero input value from the pairs of input values ($V_{0i}, V_{1i}$). The selected input values can be further provided to arithmetic units 410-$i$ (i=A, B, C, . . . X). The arithmetic units 410-$i$ (i=A, B, C, . . . X) can be configured to perform operations including multiplication of the weight W and the input values selected by the selectors 420-$i$ (i=A, B, C, . . . X). If the weight W is zero, then calculation of all multiplications can be skipped by triggering the system 400B to proceed to a next computational cycle. If the weight W is not zero, the arithmetic units 410-$i$ (i=A, B, C, . . . X) perform all operations on the weight W and the input values selected by the selectors 420-$i$ (i=A, B, C, . . . X) from the pairs ($V_{0i}, V_{1i}$), i=A, B, C, . . . X. If all of the pairs include only one non-zero input value ($V_{0i}=0$ and $V_{1i} \neq 0$) or ($V_{0i} \neq 0$ and $V_{1i}=0$), then the system 400B allows to avoid redundant multiplication by zero. However, if some of the pairs include only zero input values ($V_{0i}=0$ and $V_{1i}=0$), then the arithmetic units 410-$i$ (i=A, B, C, . . . X) still perform irrelevant multiplications by zero. The neuron computations by the system 400B can be made optimal by adding an external module that would pre-select input values to make sure that input values include no pairs ($V_{0i}, V_{1i}$), wherein both input values are zero or both input values are non-zero. Thus, adding selectors to the system 400A of FIG. 4A does not allow to avoid the performance of irrelevant operations. In addition, the system 400B includes more busses than the system 400A and so requires a larger integrated circuit than the system 400A.

Irrelevant operations may not be limited to the operations of multiplications by zero. In some embodiments, operations can be also removed from computations of neurons based on rules establishing irrelevance of operations to the result of neuron computations. For example, multiplications by small values may not be relevant. Selectors 420-$i$ (i=A, B, C, . . . X) may be configured to skip values below or higher than one or more thresholds. The irrelevance of a value for a result can also be determined by the selectors 420-$i$ (i=A, B, C, . . . X) by comparing the current result of processing unit 410-$i$ (i=A, B, C, . . . X) with the value candidates of the input pair ($V_{0i}, V_{1i}$), i=A, B, C, . . . X. Complex decision algorithms can be implemented in the selectors 420-$i$ (i=A, B, C, . . . X) to avoid irrelevant operations. For a simplicity, the methods of present disclosure are described in connection with removing irrelevant operations involving zero input values or zero weights. However, it would be evident to those skilled in art, that the same or similar methods can be used to remove irrelevant operations of other types, for example, the irrelevant operations described above.

Figure 5:
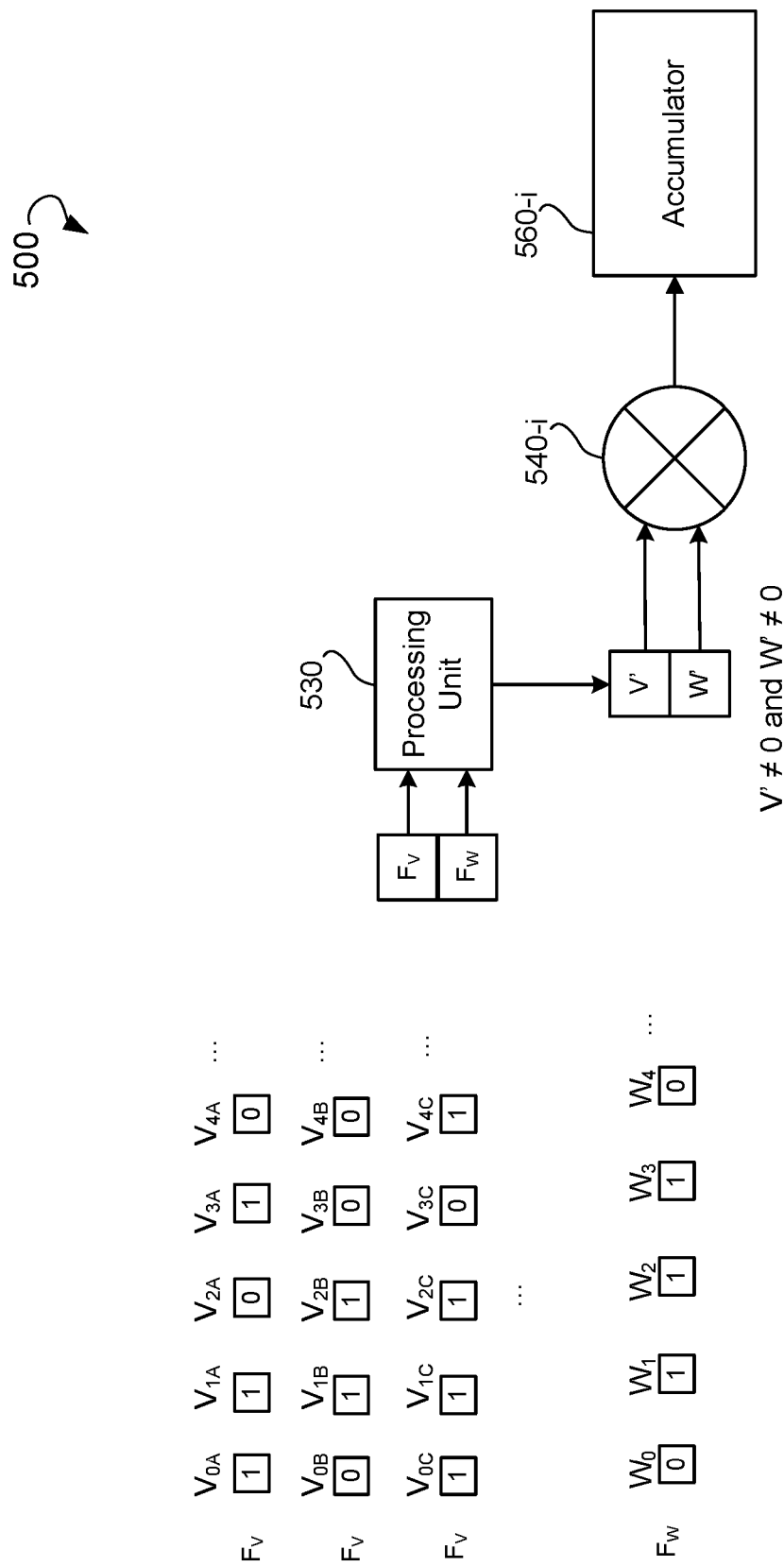
FIG. 5 is block diagram showing an example system for neuron computations in an ANN, according to some example embodiments of the present disclosure.

FIG. 5 is a block diagram showing an example system 500 for neuron computations in an ANN, according to example embodiment of the present disclosure. The system 500 may include a processing unit 530, one or more arithmetic units 540-$j$ (j=A, B, C, . . . , X) and one or more accumulators 560-$j$ (j=A, B, C, . . . X).

The system 500 may receive input values $\{V_{ij}\}$ for one or more neurons and weights $\{W_k\}$ associated with the input values, wherein j is an index of one of the arithmetic units 540-$j$ (j=A, B, C, . . . , X) and one of the accumulators 560-$j$ (j=A, B, C, . . . , X) assigned to process the input value $V_{ij}$ and the weight $W_k$. Index i of input values $\{V_{ij}\}$ may indicate an order in which the input values $V_{ij}$ can be processed by the arithmetic unit 540-$j$ and accumulator 560-$j$.

For simplicity, it is assumed that each of the weights $\{W_k\}$ is required to be multiplied with each of input values $\{V_{ij}\}$, and therefore, each of the weights $\{W_k\}$ can be provided to all the arithmetic units 540-$j$ (j=A, B, C, . . . , X). However, in other embodiments, some of the weights $\{W_k\}$ may not be required to be multiplied by the input values $V_{ij}$ because of inputs and outputs of neurons of ANN. Correspondingly, some of the weights $\{W_k\}$ can be provided only to subset of the arithmetic units 540-$j$ (j=A, B, C, . . . , X).

The arithmetic units 540-$j$ may perform multiplication of input value $V_{ij}$ and weight $W_k$. The accumulator 560-$j$ may accumulate results of the multiplications performed by the arithmetic unit 560-$j$. Each of the accumulators 560-$j$ can be associated with only one of the neurons of the ANN.

The input values $\{V_{ij}\}$ and weights $\{W_k\}$ can be labeled. For example, an extra non-zero bit can be attached to each of the non-zero input values $V_{ij}$ and an extra zero bit can be attached to each of zero input values $V_{ij}$. Similarly, an extra non-zero bit can be attached to each of the non-zero weights $W_k$ and an extra zero bit can be attached to each of zero weights $W_k$.

The processing unit 530 can be configured to determine pairs of the input values $V_{ij}$ and the weights $W_k$, wherein both the input value $V_{ij}$ and the weight $W_k$ are relevant to results of neuron computations. The input value $V_{ij}$ and the weight $W_k$ can be relevant if both the input value $V_{ij}$ and the weight $W_k$ are not zero. In other embodiments, the input value $V_{ij}$ and the weight $W_k$ can be relevant if each of the input value $V_{ij}$ and the weight $W_k$ is above a pre-determined threshold. In certain embodiments, the input value $V_{ij}$ and the weight $W_k$ can be determined as relevant by comparison of their values to a current result of summation of input values and weights, for example, a partial sum of equation (2). For example, the processing unit 530 can read extra bits Fv attached to the input values $V_{ij}$ and extra bits Fw attached to the weights $W_k$ and provide to the arithmetic units 540-$j$ (j=A, B, C, . . . , X) only those pairs (V', W') wherein a non-zero bit is attached to both the input value V' and the weight W'. The processing unit 530 may skip the pairs ($V_{ij}$, $W_k$) wherein either the input value $V_{ij}$ or the weight $W_k$ is labeled by a zero bit and so avoid performing redundant multiplication by zero. However, it may be complicated to implement the system 500 using hardware units, for example ASICs or FPGAs, because a large bus can be required to connect the processing unit 530 and the arithmetic units 540-j (j=A, B, C, . . . , X), which may increase a size of the integrated circuit, ASIC, or FPGA implementing the system 500.

Figure 6:
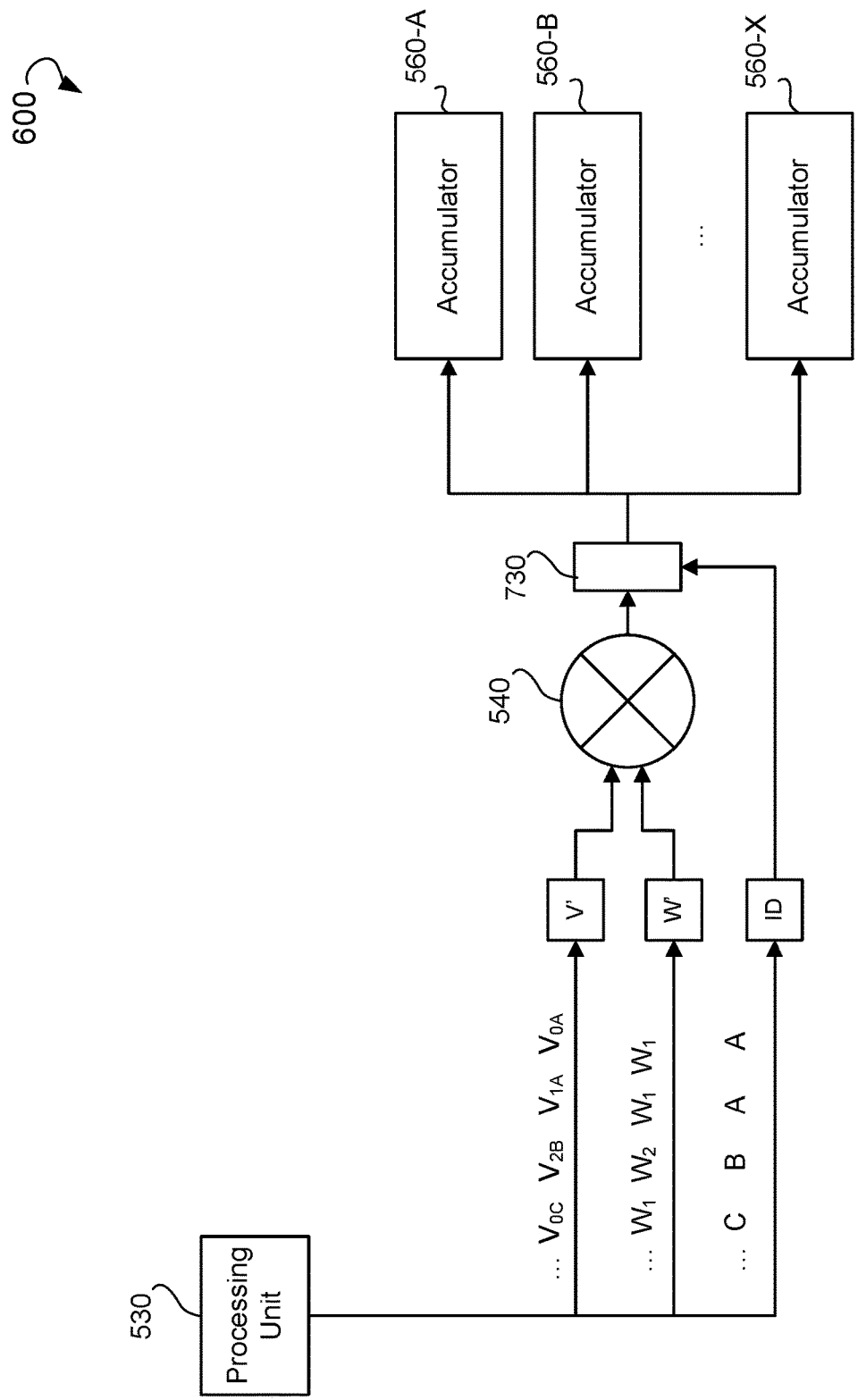
FIG. 6 is a block diagram showing an example system for neuron computations in an ANN, according to an example embodiment of the present disclosure.

FIG. 6 is a block diagram showing an example system 600 for neuron computations of an ANN, according to another example embodiment of the present disclosure. The system 600 may include a processing unit 530, an arithmetic unit 540, one or more accumulators 560-j (j=A, B, C, . . . X), and a selector 630.

The system 600 may receive input values $\{V_{ij}\}$ (shown in FIG. 5) for one or more neurons of ANN and weights $\{W_k\}$ (shown in FIG. 5) associated with the input values, wherein j is an index of one of the accumulators 560-j (j=A, B, C, . . . , X) assigned to a neuron of the ANN. Index i may indicate an order in which the input values $V_{ij}$ and the weights $W_k$ can be processed by the arithmetic unit 540 and accumulator 560-j. As indicated above in connection to FIG. 5, it is assumed, for simplicity, that each of the weights $\{W_k\}$ is required to be multiplied with each of input values $\{V_{ij}\}$. The zero input values $\{V_{ij}\}$ and the zero weights $\{W_k\}$ can be labeled with a zero extra bit, and the non-zero input values $\{V_{ij}\}$ and the non-zero weights $\{W_k\}$ can be labeled with a non-zero extra bit as described in FIG. 5. The label can be implemented as an enable signal in an electronic system or by other ways of carrying the information of the relevance of the value $V_{ij}$ or the weight $W_k$ for the result.

The processing unit 530 may select pairs (V', W') of the input values $\{V_{ij}\}$ and the weights $\{W_k\}$, wherein both the input value V' and the weight W' are relevant, and provide the selected pairs (V', W') to the arithmetic unit 540. The processing unit 530 may also provide an identifier ID to the selector 630. The arithmetic unit 540 can perform multiplication of the input value V' and the weight W'. The selector 630 may provide, based on the identifier ID, the result of multiplication of the input value V' and the weight W' to the accumulator 560-j associated with the identifier ID. In some embodiments, the identifier ID can be based on an identifier of a neuron in the ANN. Each of the accumulators 560-j (j=A, B, C, . . . , X) can be associated with only one neuron of the ANN. If implemented by hardware units, for example ASICs or FPGAs, the system 600 may require a smaller bus for connecting the processing unit 530 and the accumulators 560-j (j=A, B, C, . . . , X) than the system 500 of FIG. 5. The system 600 may also process only operations relevant to the result of neuron computations to provide an optimal solution for computing the output of a neuron.

In some embodiments, the system 600 may be configured to process a pre-determined number of pairs (V', W') in a single computational cycle. For example, the system 600 may include additional arithmetic units for multiplication of input values and weights and additional selectors for providing the results of the multiplications to the accumulators 560-j (j=A, B, C, . . . , X). In some embodiments, the processing unit 530 may determine an order for processing the input values $\{V_{ij}\}$ and the weights $\{W_k\}$ in a way that most relevant values are processed before least relevant values. In some embodiments, the system 600 may include multiple arithmetic units 540 and selectors 630. Each of the multiple selectors 630 can be associated with the multiple arithmetic unit 540. The multiple selectors 630 can be also associated with the same the accumulators 560-j, which are shared between the multiple selectors 630. Each accumulator 560-j may receive, from one of the multiple selectors 630, one result of multiplication of one of the arithmetic units 540, at a given time.

Figure 7:
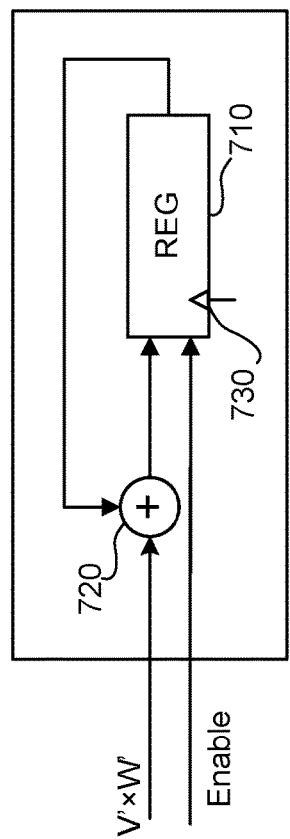
FIG. 7 is a block diagram showing an example accumulation unit.

FIG. 7 is a block diagram showing an example accumulation unit 700. The accumulation unit 700 may represent a conventional accumulator. The accumulation unit 700 can be used as one of the accumulators 560-i in the system 500 shown in FIG. 5 or the accumulators 560-j (j=A, B, . . . , X) in the system 600 shown in FIG. 6. The accumulation unit 700 may include a register unit 710, an adder unit 720, and a clock input 730. The accumulation unit 700 may receive a result V'×W' of multiplication of pair of input value V' and weight W' and an enable signal. The enable signal may represent either 0 or 1. At one clock cycle, the adder unit 720 may add a value stored in register unit 710 and the result V'×W' to obtain a sum. If the enable signal is 1, then the register unit 710 replaces the stored value with the sum. If the enable signal is 0, then the register unit 710 keeps currently stored value unchanged.

Figure 8:
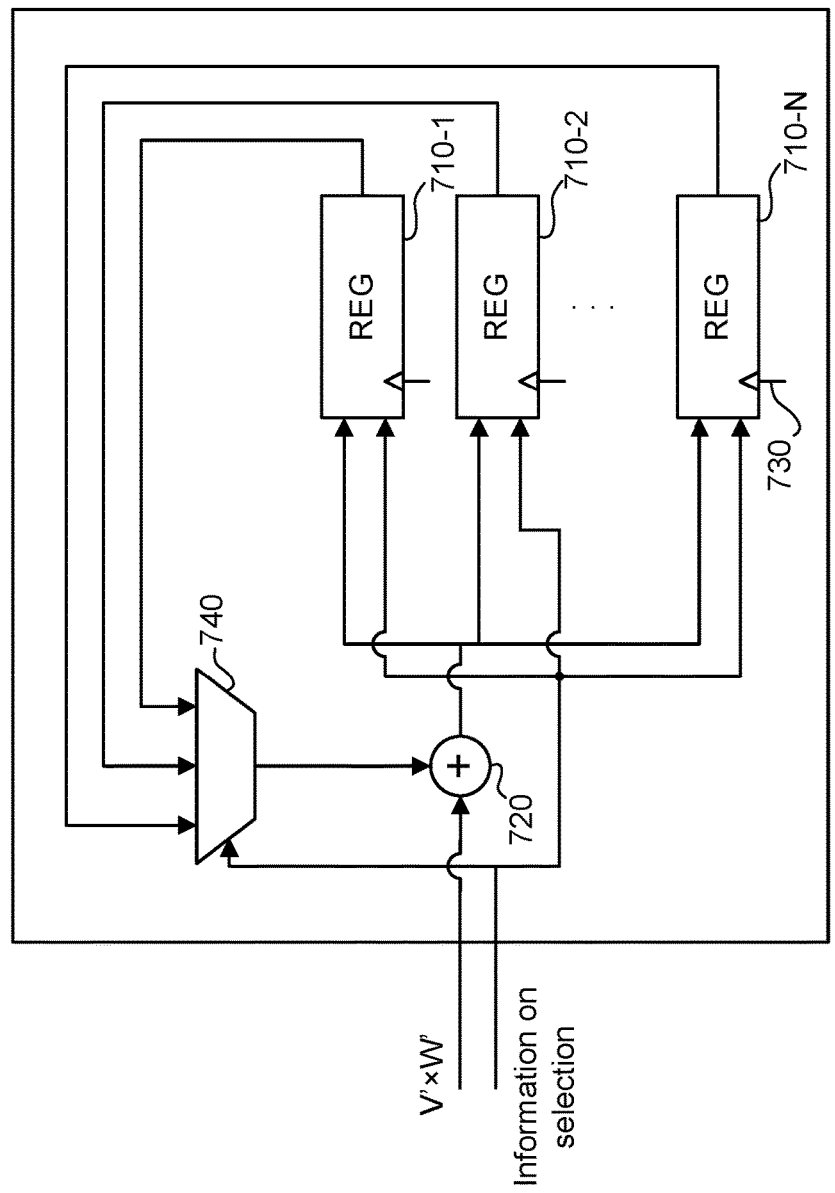
FIG. 8 is a block diagram showing an example accumulation unit, according to embodiments of the present disclosure.

FIG. 8 is a block diagram showing an example accumulation unit 800, according to some embodiments of the present disclosure. The accumulation unit 800 can be used as one of the accumulators 560-j (j=A, B, C, . . . , X) in the system 600 shown in FIG. 6. The accumulation unit 800 may include multiple register units 710-i (i=1, . . . , N), an adder unit 720, a clock input 730, and a multiplexer unit 740. The accumulation unit 800 may receive a result V'×W' of the multiplication of pair of input value V' and weight W' and information concerning the selection.

At one clock cycle, the multiplexer unit 740 may select, based on the information concerning the selection, a value stored in one of the register units 710-i (i=1, . . . , N). The information concerning the selection may include an index or an address of the register unit. The adder unit 720 may add the selected value and the result V'×W' to obtain a sum. The sum can be stored in the register unit selected based on the information on selection. The result V'×W' and the information on selection can be changed at a further clock cycle. Therefore, a different register unit can be selected by the multiplexer unit 740 based on the information concerning selection.

Figure 9:
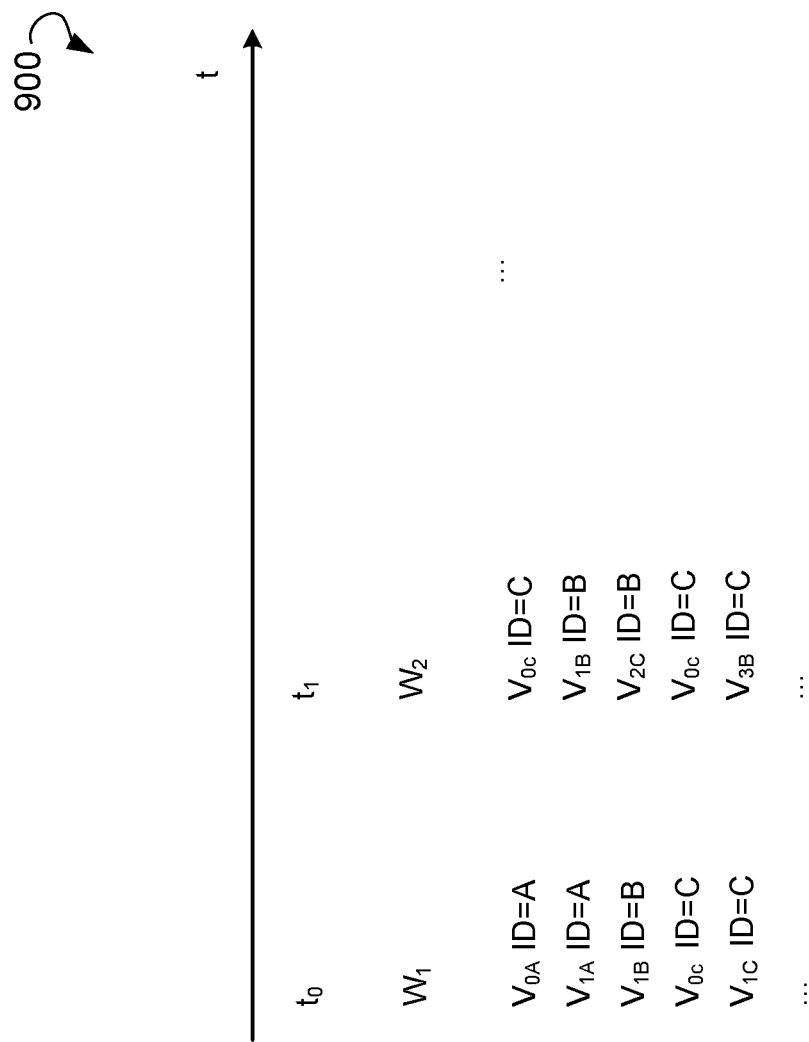
FIG. 9 is a schematic showing an example order of processing input values and weights in neuron computations in an ANN, according to an example embodiment of the present disclosure.

FIG. 9 is a schematic 900 showing an example order in which the processing unit 530 may select the input values $\{V_{ij}\}$ and the weights $\{W_k\}$ for further processing. For example, at the first cycle at time $t_0$, the processing unit 530 may select the first non-zero weight $W_1$ from the weights $\{W_k\}$ and all non-zero input values $\{V_{ij}\}$ corresponding to the weight $W_1$. The processing unit 530 may provide the weight $W_1$ and selected non-zero input values to the arithmetic units and identifier ID for each of the selected non-zero input values to selectors. The identifier ID may indicate an accumulator which accumulates the result of multiplication of the weight $W_1$ and the input value corresponding to the identifier ID. At the next computational cycle at time $t_1$, the processing unit 530 may select next non-zero weight $W_2$ from the weights $\{W_k\}$ and all non-zero input values $\{V_{ij}\}$ corresponding to the weight $W_2$, and so forth.

In some embodiments, the processing unit 530 may monitor a density of non-zero input values in input values $\{V_{ij}\}$ and density of non-zero weights in weights $\{W_k\}$. If the densities of the non-zero input values and the non-zero weights exceed a pre-determined threshold, then the processing unit 530 may skip selection of the pairs of non-zero input values and non-zero input weights, and all the input values $\{V_{ij}\}$ and weights $\{W_k\}$ can be provided to the arithmetic unit 540 for performing multiplications.

Figure 10:
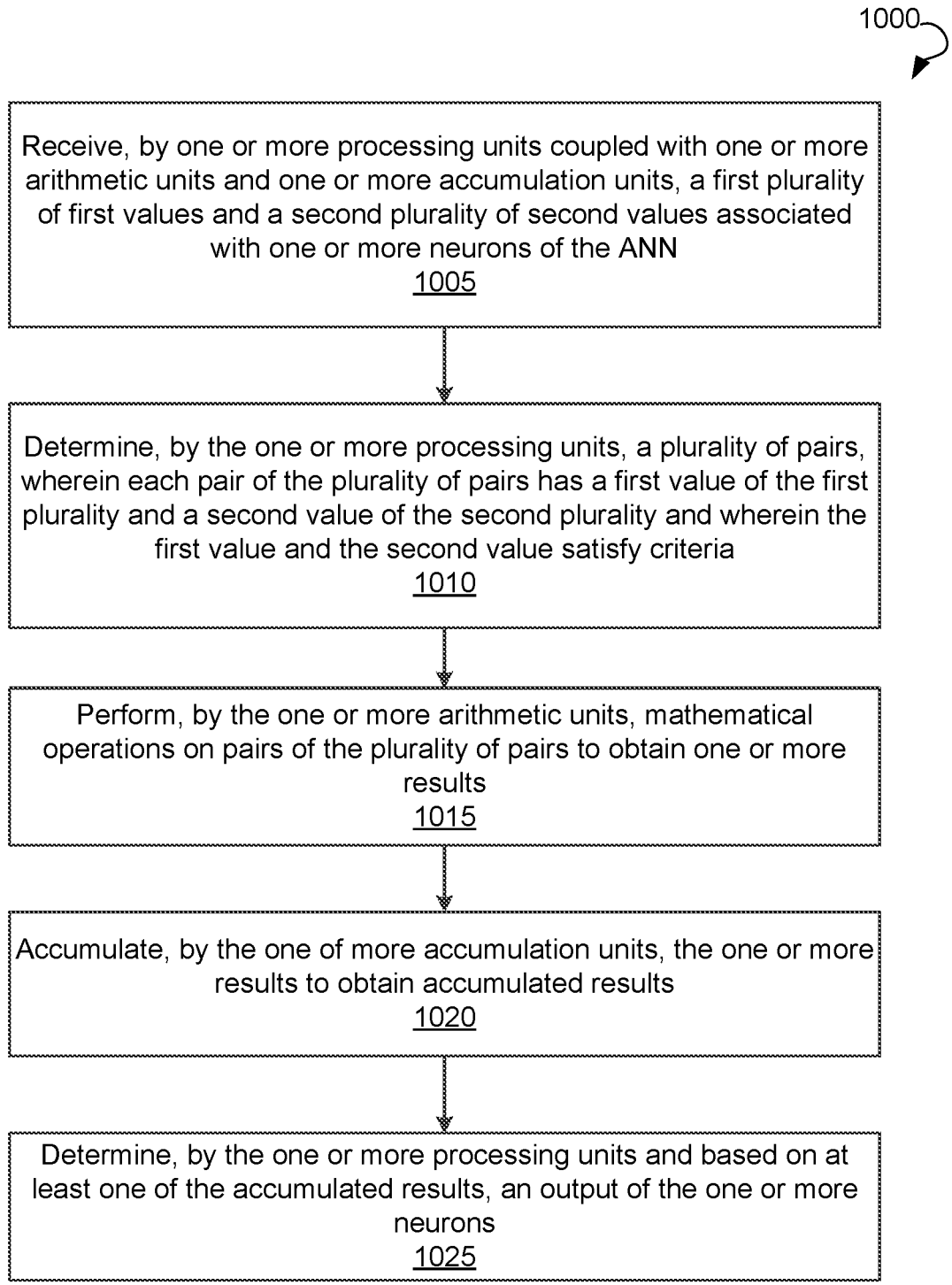
FIG. 10 is a flow chart illustrating a method for accelerating neuron computations in ANNs, according to some example embodiments of the present disclosure.

FIG. 10 is a block diagram showing a method 1000 for accelerating neuron computations in ANN, according to some example embodiments. The method 1000 may be performed by system 100 described above with reference to FIG. 1.

In block 1005, the method 1000 may receive, by one or more processing units coupled with one or more arithmetical units and one or more accumulation units, a first plurality of first values and a second plurality of second values associated with one or more neurons of ANN. The first plurality of first values may include inputs of the one or more neurons of the ANN and the second plurality of the second values includes weights associated with the inputs of the neurons of the ANN. Alternatively, the first plurality of first values may include the weights associated with the inputs of the neurons of the ANN and the second plurality of the second values includes the inputs of the neurons.

In block 1010, the method 1000 may generate, by the processing units, a plurality of pairs. Each pair of the plurality of pairs has a first value of the first plurality and a second value of the second plurality such that the first value and the second value satisfy criteria. Determining that first value and the second value satisfy the criteria may include comparing the first value to a first reference number and comparing the second value to a second reference number. The first reference number or the second reference number can be zero. The method may include assigning, by the processing units, labels to the pairs of the plurality of pairs. The labels can be associated with at least one accumulation unit of the one or more accumulation units.

In block 1015, the method 1000 may perform, by the arithmetic units, mathematical operations on pairs of the plurality of pairs to obtain one or more results.

In block 1020, the method 100 may accumulate, by the accumulation units, the results to obtain accumulated results. The method 1000 may then select, by the processing units and based on the labels, an accumulation unit from the one or more accumulation units to accumulate a result of mathematical operations performed on the pair. Different accumulation units can be configured to accumulate the results of the mathematical operations performed by the same arithmetic unit.

In block 1025, the method 1000 may proceed with determining, by the processing units and based on at least one of the accumulated results, an output of the one or more neurons.

Figure 11:
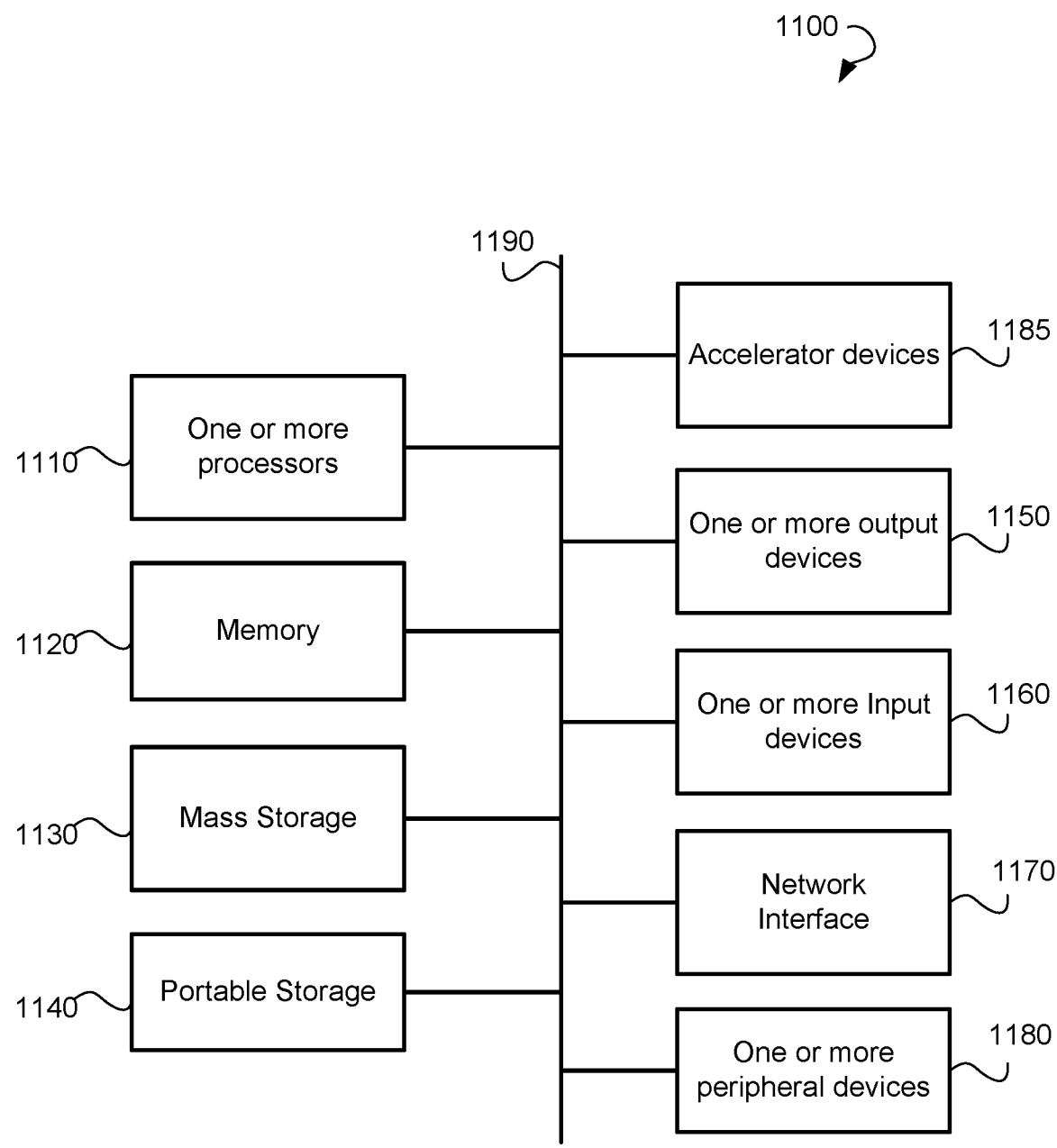
FIG. 11 shows a computing system that can be used to implement embodiments of the disclosed technology.

FIG. 11 illustrates an example computing system 1100 that may be used to implement embodiments described herein. The example computing system 1100 of FIG. 11 may include one or more processors 1110 and memory 1120. Memory 1120 may store, in part, instructions and data for execution by the one or more processors 1110. Memory 1120 can store the executable code when the exemplary computing system 1100 is in operation. The processor 1110 may include internal accelerators like a GPU, a FPGA, or similar accelerators that may be suitable for use with embodiments described herein. The memory 1120 may include internal accelerators like a GPU, a FPGA, or similar accelerators that may be suitable for use with embodiments described herein. The example computing system 1100 of FIG. 11 may further include a mass storage 1130, portable storage 1140, one or more output devices 1150, one or more input devices 1160, a network interface 1170, and one or more peripheral devices 1180.

The components shown in FIG. 11 are depicted as being connected via a single bus 1190. The components may be connected through one or more data transport means. The one or more processors 1110 and memory 1120 may be connected via a local microprocessor bus, and the mass storage 1130, one or more peripheral devices 1180, portable storage 1140, and network interface 1170 may be connected via one or more input/output buses.

Mass storage 1130, which may be implemented with a magnetic disk drive, an optical disk drive or a solid state drive, is a non-volatile storage device for storing data and instructions for use by a magnetic disk, an optical disk drive or SSD, which in turn may be used by one or more processors 1110. Mass storage 1130 can store the system software for implementing embodiments described herein for purposes of loading that software into memory 1120. The mass storage 1130 may also include internal accelerators like a GPU, a FPGA, or similar accelerators that may be suitable for use with embodiments described herein.

Portable storage 1140 may operate in conjunction with a portable non-volatile storage medium, such as a compact disk (CD) or digital video disc (DVD), to input and output data and code to and from the computing system 1100 of FIG. 11. The system software for implementing embodiments described herein may be stored on such a portable medium and input to the computing system 1100 via the portable storage 1140.

One or more input devices 1160 provide a portion of a user interface. The one or more input devices 1160 may include an alphanumeric keypad, such as a keyboard, for inputting alphanumeric and other information, or a pointing device, such as a mouse, a trackball, a stylus, or cursor direction keys. Additionally, the computing system 1100 as shown in FIG. 11 includes one or more output devices 1150. Suitable one or more output devices 1150 include speakers, printers, network interfaces, and monitors.

Network interface 1170 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 1170 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 1180 may include any type of computer support device to add additional functionality to the computing system. The one or more peripheral devices 1180 may include a modem or a router.

The example computing system 1100 of FIG. 11 may also include one or more accelerator devices 1185. The accelerator devices 1185 may include PCIe-form-factor boards or storage-form-factor boards, or any electronic board equipped with a specific electronic component like a GPU, a Neural Processing Unit, a Multi-CPU component, a FPGA component, or similar accelerating electronic or photonic components, that may be suitable for use with embodiments described herein.

The components contained in the exemplary computing system 1100 of FIG. 11 are those typically found in computing systems that may be suitable for use with embodiments described herein and are intended to represent a broad category of such computer components that are well known in the art. Thus, the exemplary computing system 1100 of FIG. 11 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The instructions or data may not be used by the CPU but be accessed in writing or reading from the other devices without having the CPU directing them.

Thus, systems and methods for accelerating ANN computations are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for accelerating computation of an artificial neural network (ANN), the system comprising:
   one or more arithmetic units;
   one or more accumulation units; and
   one or more processing units coupled with the one or more arithmetic units and the one or more accumulation units, wherein:
   the one or more processing units are configured to:
      receive a first plurality of first values and a second plurality of second values associated with one or more neurons of the ANN; and
      determine a plurality of pairs, wherein each pair of the plurality of pairs has a first value of the first plurality and a second value of the second plurality and wherein the first value and the second value satisfy criteria;
   the one or more arithmetic units being configured to perform mathematical operations on pairs of the plurality of pairs to obtain one or more results;
   the one of more accumulation units being configured to accumulate the one or more results to obtain accumulated results; and
   the one or more processing units being configured to:
      determine, based on at least one of the accumulated results, an output of the one or more neurons;
      assign a label to a pair of the plurality of pairs, the label being associated with at least one accumulation unit of the one or more accumulation units; and
      select, based on the label, an accumulation unit from the one or more accumulation units to accumulate a result of mathematical operations performed on the pair.

2. The system of claim 1, wherein the one or more processing units are configured to determine that the first value and the second value satisfies the criteria by comparing the first value to a first reference number or comparing the second value to a second reference number.

3. The system of claim 2, wherein at least one of the first reference number or the second reference number is zero.

4. The system of claim 1, wherein a number of the one or more accumulation units is larger than a number of the one or more arithmetic units.

5. The system of claim 1, wherein at least one accumulation unit of the one or more accumulation units is configured to accumulate results of mathematical operations performed by at least two different arithmetic units of the one or more arithmetic units.

6. The system of claim 1, wherein a count of pairs in the plurality of pairs determined by the one or more processing units is less than a total number of further pairs, the further pairs being obtained by associating each of a first value of the first plurality with each of a second value of the second plurality.

7. The system of claim 1, wherein the one or more processing units are configured to:
   for each first value of the first plurality, generate a first label indicative of whether the first value can be omitted in the computations of the one or more neurons or the first value cannot be omitted in the computations of the one or more neurons; and
   for each second value of the second plurality, generate a second label indicative of whether the second value can be omitted in the computations of the one or more neurons or the second value cannot be omitted in the computations of the one or more neurons; and wherein the first label and the second label are used to configure the one or more accumulation units.

8. The system of claim 7, wherein:
the first label includes a first binary enable signal;
the second label includes a second binary enable signal; and
wherein the determining that the first value and the second value satisfy criteria includes a Boolean operation on the first binary enable and the second binary enable.

9. The system of claim 1, wherein one of:
the first plurality of first values includes inputs of the one or more neurons of the ANN and the second plurality of the second values includes weights associated with the inputs of the one or more neurons of the ANN; or
the first plurality of first values includes the weights associated with the inputs of the one or more neurons of the ANN and the second plurality of the second values includes the inputs of the one or more neurons.

10. The system of claim 1, wherein at least one arithmetic unit of the one or more arithmetic units include at least one electronic circuit configured to perform the mathematical operations.

11. The system of claim 10, wherein the at least one electronic circuit includes one or more clock signals to trigger the performing of mathematical operations by the at least one electronic circuit.

12. The system of claim 11, wherein the at least one arithmetic unit is configured to, based on a clock of the one or more clock signals:
at a first cycle of the clock, execute a mathematical operation on a first pair of the plurality of pairs to obtain a first result to be accumulated by a first accumulation unit of the one or more accumulation units;
at a second cycle of the clock, execute a mathematical operation on a second pair of the plurality of pairs to obtain a second result to be accumulated by a second accumulation unit of the one or more accumulation units; and
at a third cycle of the clock, execute a mathematical operation on a third pair of the plurality of pairs to obtain a third result to be accumulated by the first accumulation unit of the one or more accumulation units, wherein the first accumulation unit differs from the second accumulation unit.

13. The system of claim 10, wherein the electronic circuit includes one or more enable signals to trigger at least one of the accumulation units to accumulate a result of mathematical operations performed by the at least one arithmetic units.

14. The system of claim 1, wherein the performing the mathematical operations on at least one pair of the plurality of the pairs includes multiplication of a first value of the at least one pair and a second value of the at least one pair.

15. The system of claim 1, wherein at least one accumulation unit of the one or more accumulation units includes:
at least one adder unit;
at least one multiplexer unit; and
a plurality of register units, wherein the at least one accumulation unit is configured to receive a result from at least one of the arithmetic units and an information on selection, and wherein:
the at least one multiplexer unit is configured to:
select, based on the information of selection, a register unit from the plurality of register units;
provide a value stored in the selected register unit to the adder unit;
the adder unit being configured to perform an addition of the stored value and the result to obtain a sum; and
wherein
the sum is stored back to a register unit of the plurality of register units.

16. A method for accelerating computation of an artificial neural network (ANN), the method comprising:
receiving, by one or more processing units coupled with one or more arithmetic units and one or more accumulation units, a first plurality of first values and a second plurality of second values associated with one or more neurons of the ANN;
determining, by the one or more processing units, a plurality of pairs, wherein each pair of the plurality of pairs has a first value of the first plurality and a second value of the second plurality and wherein the first value and the second value satisfy criteria;
performing, by the one or more arithmetic units, mathematical operations on pairs of the plurality of pairs to obtain one or more results;
accumulating, by the one of more accumulation units, the one or more results to obtain accumulated results;
determining, by the one or more processing units and based on at least one of the accumulated results, an output of the one or more neurons;
assigning, by the one or more processing units, a label to a pair of the plurality of pairs, the label being associated with at least one accumulation unit of the one or more accumulation units; and
selecting, by the one or more processing units and based on the label, an accumulation unit from the one or more accumulation units to accumulate a result of mathematical operations performed on the pair.

17. The method of claim 16, wherein the determining that the first value and the second value satisfy the criteria includes comparing the first value to a first reference number or comparing the second value to a second reference number.

18. A system for accelerating computation of an artificial neural network (ANN), the system comprising:
one or more arithmetic units;
one or more accumulation units; and
one or more processing units coupled with the one or more arithmetic units and the one or more accumulation units, wherein:
the one or more processing units are configured to:
receive a first plurality of first values and a second plurality of second values associated with one or more neurons of the ANN; and
determine a plurality of pairs, wherein each pair of the plurality of pairs has a first value of the first plurality and a second value of the second plurality and wherein the first value and the second value satisfy criteria;
the one or more arithmetic being configured to perform mathematical operations on the pairs of the plurality of pairs to obtain one or more results; and
the one or more processing units being configured to obtain accumulated results by:
for each pair of the plurality of pairs:
selecting, based on a label assigned to the pair, an accumulation unit;
causing the selected accumulation unit to accumulate a result of one or more results corresponding to the pair; and determine, based on the accumulated results, an output of the one or more neurons.

\* \* \* \* \*